Patented Nov. 23, 1926.

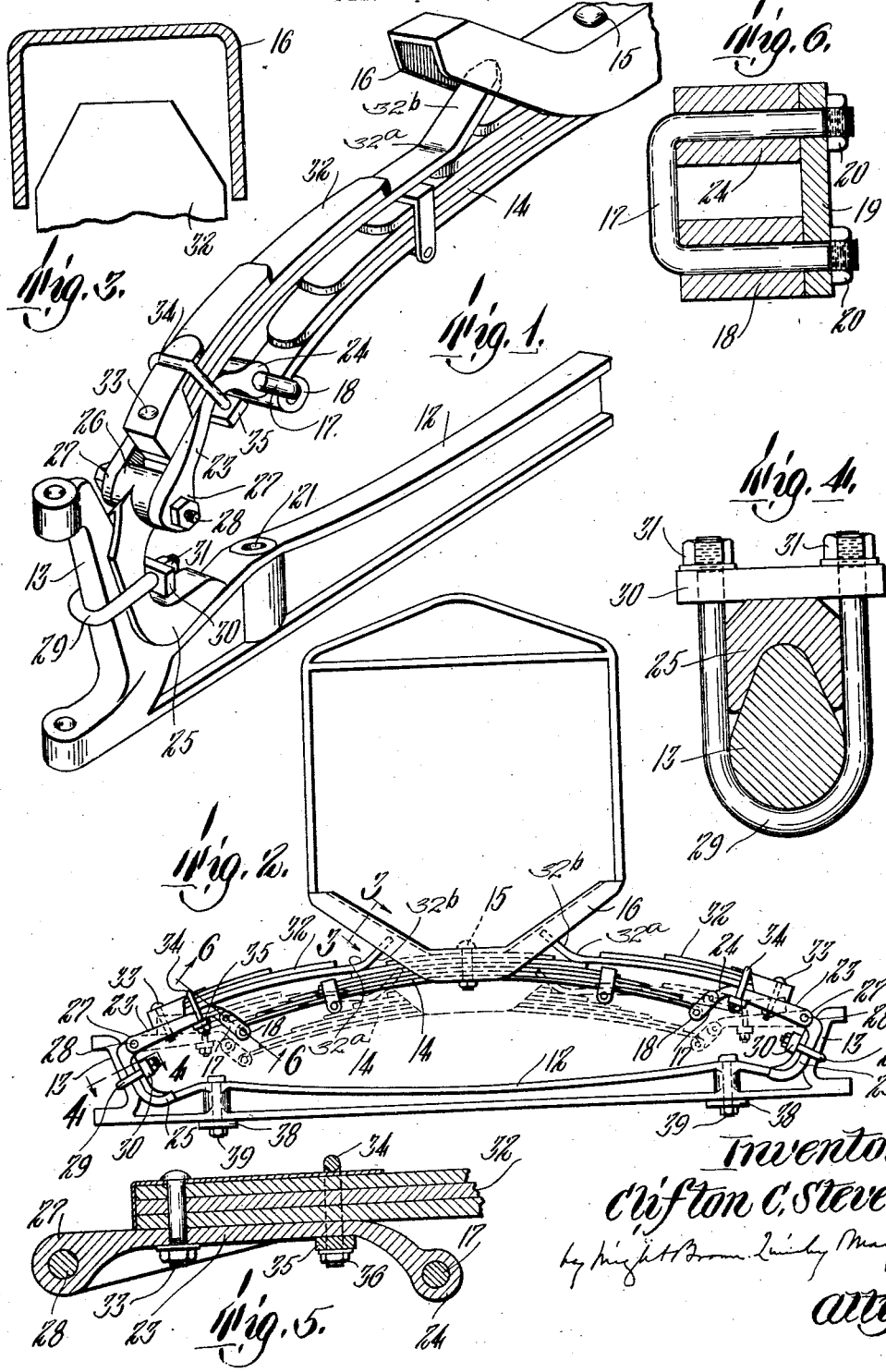

1,608,007

UNITED STATES PATENT OFFICE.

CLIFTON C. STEVENS, OF BOSTON, MASSACHUSETTS.

SPRING SUPPORT FOR MOTOR VEHICLES.

Application filed April 6, 1925. Serial No. 20,921.

This invention relates to a motor vehicle of the Ford type including a forward axle and a front body-supporting spring located above and extending lengthwise of the axle, and attached centrally to a member of the vehicle body.

In a Ford car the ends of the front body-supporting spring are usually connected by shackles with perches rigidly secured to the axle, so that the cushioning effect of the body spring is due largely to flexure of the spring, no provision being made for permitting uniform or equal movement of all portions of the body spring toward and from the axle. The spring is, therefore, liable to be broken at its midlength portion where it is bolted to a member of the vehicle body.

The object is to provide an attachment for a motor vehicle of the Ford type, adapted to be substituted for the usual perches on the axle, and to engage the usual spring shackles, said attachment being also adapted to normally and yieldingly maintain the body spring at a maximum distance from the axle and permit uniform movement of all portions of the body spring toward and from the axle, and further adapted to be installed in operative relation to the axle and body spring, without modification of the structure thereof.

Of the accompanying drawings forming a part of this specification,—

Figure 1 is a perspective view, showing portions of the front axle and of the body spring of a Ford car, and a unit of the attachment embodying the invention.

Figure 2 is an end view, looking toward the front end of a Ford car, and showing the front axle, the body spring and the two units in which the attachment of my invention is embodied.

Figure 3 is a section on line 3—3 of Figure 2.

Figure 4 is a section on line 4—4 of Figure 2.

Figure 5 is a fragmentary sectional view, showing one of the swinging links and a portion of one of the auxiliary springs hereinafter described.

Figure 6 is a section on line 6—6 of Figure 2.

The same reference characters indicate the same parts in all of the figures.

In the drawings, 12 designates the front axle provided at its ends with the usual yokes 13, constituting elements of the usual steering knuckles, the other elements of which are not shown. 14 designates the front body-supporting spring located above and extending lengthwise of the axle, the spring being fixed at its midlength portion as by a bolt 15, to a member 16 of the body frame. Said member is channeled, open at its bottom, and provided with inclined end portions, at opposite ends of a body spring-receiving portion in which the midlength portion of the body spring is secured as usual, the inclined ends of the body member diverging from the body spring, as shown by Figures 1 and 2. The ends of the spring are formed to engage shackles, one of which is shown by Figure 6, each shackle including a two-armed yoke 17, one of the arms of which is engaged with an eye 18 on the spring, and a shackle bar 19, engaged with the arms of the yoke and secured by nuts 20. The spring shackles are adapted to be engaged with links 23, forming parts of the attachment hereinafter described, substituted for the usual perches which have bolts or shanks inserted in orifices 21 in the axle, and rigidly secured to the latter.

Said attachment is composed of two duplicate units, located at opposite sides of the midlength portion of the body spring. Each unit includes a swinging link 23, connected by a hinge with an outer end portion of the axle, the hinge permitting the link to swing in a vertical plane. The link projects inward from the hinge, and its swinging end is provided with an eye 24, engaging one of the arms of the shackle. The hinge connecting the link 23 with the axle is provided by a bracket 25, grooved as shown by Figure 4, to receive one edge of the axle bracket 13, and provided with a hinge socket member 26, hinge ears 27, formed on the outer end of the link, and a pintle 28, connecting the socket member with the ears. The supplemental bracket 25 is detachably secured to the axle yoke 13, by a clip including a U-shaped member 29, engaging the yoke 13, a cross-bar 30, receiving the arms of said member, and nuts 31, clamping the bar 30 against the bracket 25.

Fixed to and bearing on the upper side of the link 23, is an auxiliary leaf spring 32, projecting inward from the swinging end of the link and in sliding contact with the upper surface of the body spring 14. In this instance, the auxiliary spring is fixed to the link by a bolt 33, and by a clip including a yoke 34, a cross-bar 35, and nuts 36.

It will now be seen that the two auxiliary springs co-operate with the body spring and with the other members of the attachment, in normally maintaining the links 23, the spring shackles, and the body spring in the elevated positions shown by Figure 1 and by full lines in Figure 2, and are adapted to yield to permit downward swinging movement of the links and bodily downward movement of the body spring, to the positions shown by dotted lines, the downward movement of the body spring involving such slight flexure thereof, that there is no liability of breakage of the body spring at its attached midlength portion. An increased amplitude of movement of the body spring toward and from the axle is permitted by the attachment.

The auxiliary springs and the hinged links in effect increase the length of the spring suspension, the effective length being the length of the body spring plus the length of the links. This increased length is an important factor in prolonging the life of the body spring.

The elements of the attachment cooperate with the body spring in such manner as to reduce road shocks or jars to a negligible minimum.

The inner leaves of the auxiliary springs 32 are provided with bends 32$^a$ located adjacent their outer or free ends, and providing bearing surfaces of small area bearing on the body spring at points outside the body member 16. The terminal portions 32$^b$ of the auxiliary springs, or the portions between the bends 32$^a$ and the extremities of the inner leaves, are inclined upward from the bends and project into the inclined portions of the body members 16, to prevent edgewise displacement of the auxiliary springs.

It will be seen that the location of the bends 32$^a$ and their bearing on the body spring, determines the effective length of the auxiliary springs, so that by varying the location of the bends, or their distance from the inner ends of the auxiliary springs, their effective length may be varied to increase or decrease the resistance of the auxiliary springs to upward rebound of the body spring. In a passenger vehicle the location of the bends 32$^a$ may be as indicated by the drawings. In a truck requiring stiffer auxiliary springs, the bends 32$^a$ may be located nearer the inner ends of the auxiliary springs.

The attachment may be installed in a used car by separating the body spring shackles from the usual perches on the front axle, engaging said shackles with the swinging ends of the links 23, and clamping the brackets 25 to the axle yokes 13, no change or adaptation of the axle, its yokes, the body members 16, and the body spring being required. The perches are generally utilized to attach the forward ends of the arms 38 of the usual wish-bone element of the running gear to the axle. If desired, the perches may be retained on the axle to perform this function. I prefer, however, to remove the perches and secure the wish-bone arms to the axle by bolts 39, as shown by Figure 2, said bolts being inserted in the axle orifices 21.

I claim:

In a motor vehicle which includes a forward axle having steering knuckle yokes at its opposite ends, a front body-supporting spring located above and extending lengthwise of the axle, and a channeled body member open at its lower side and provided with inclined end portions and a central body spring-receiving portion, the body spring being centrally attached to said body member within said receiving portion, the combination with said axle, body spring, and body member, of brackets seated on the axle and its yokes, means detachably securing the brackets to the yokes, links pivoted to the brackets to swing in vertical planes, shackles connecting the swinging ends of the links with the ends of the body spring, and rebound-resisting auxiliary leaf springs detachably secured to the links, extending inward therefrom and having bends adjacent to their outer ends bearing on the body spring at points outside the body member, the terminal portions of the auxiliary springs being inclined upward from said bends and projecting into the inclined portions of the body member, to prevent edgewise displacement of the auxiliary springs, the said bends determining the effective length of the auxiliary springs, so that their effective length may be varied by varying the location of the bends to vary the resistance of the auxiliary springs to rebound.

In testimony whereof I have affixed my signature.

CLIFTON C. STEVENS.